Figure 1:
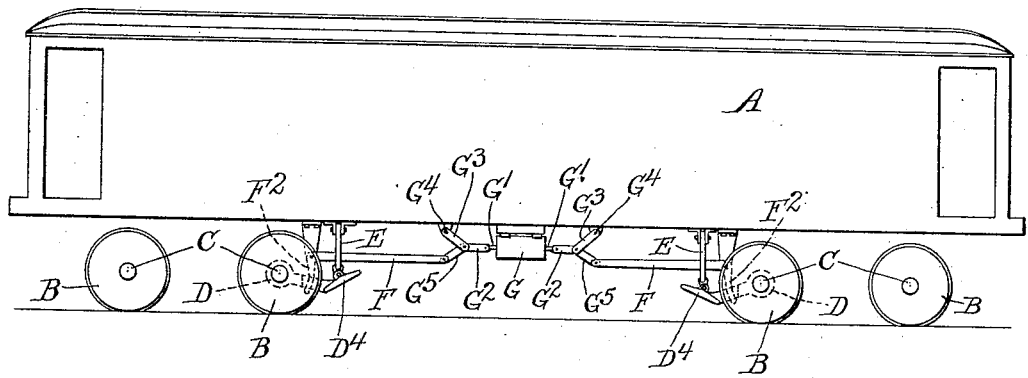
Figure 2:
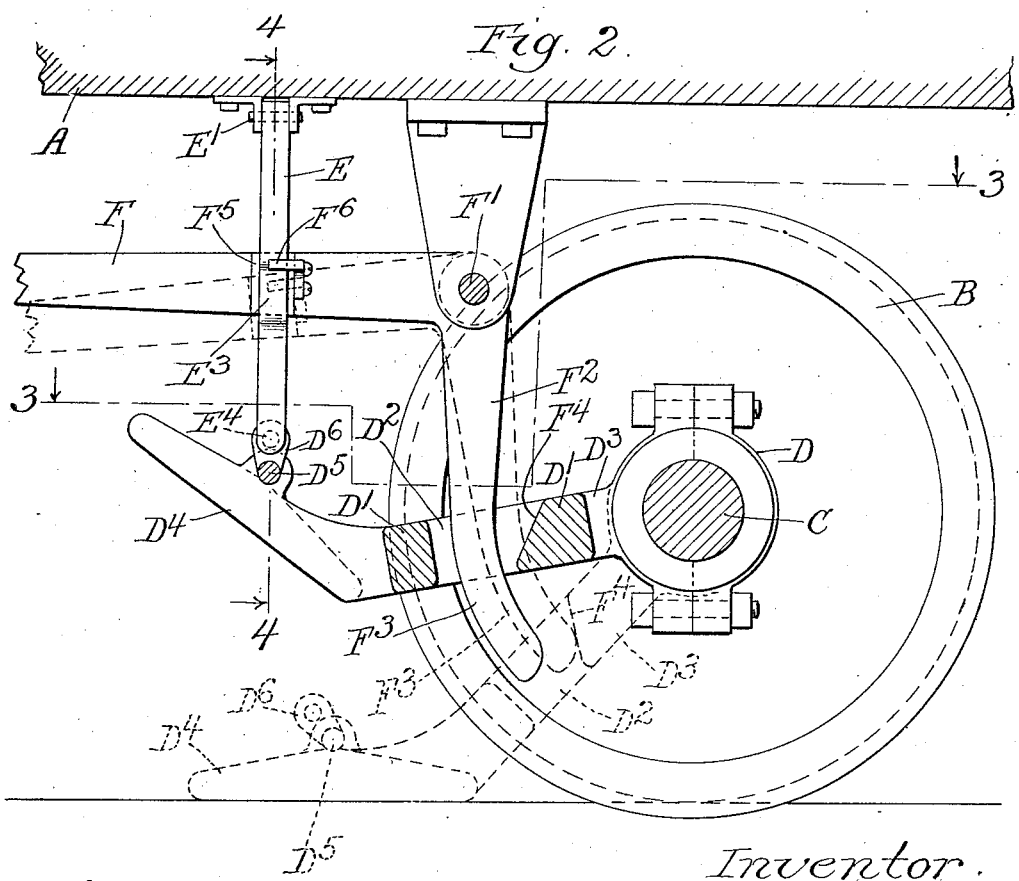

F. C. FOSTER.
CAR BRAKE.
APPLICATION FILED SEPT. 2, 1919.

1,394,990.

Patented Oct. 25, 1921.

2 SHEETS—SHEET 1.

Witness,
Edward T. Wray.

Inventor.
Freling C. Foster.
by Parker & Carter
Attorneys

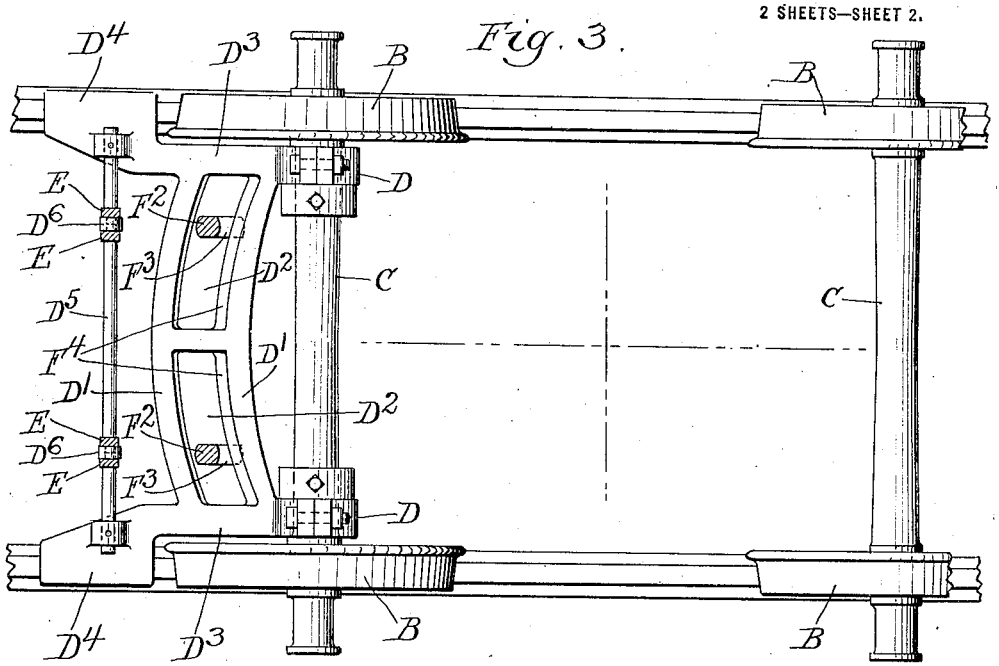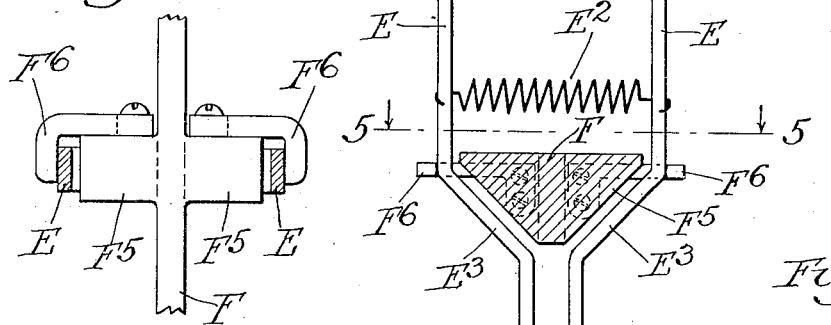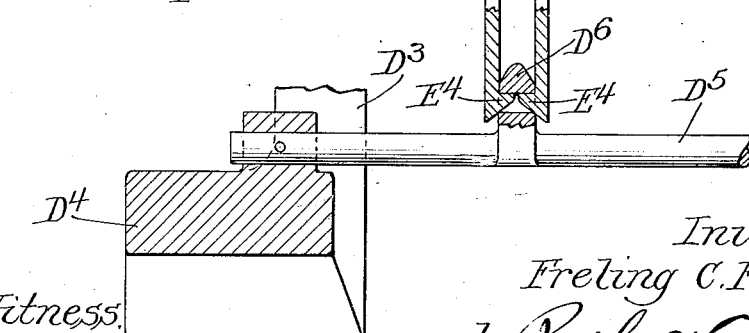

UNITED STATES PATENT OFFICE.

FRELING C. FOSTER, OF CHICAGO, ILLINOIS.

CAR-BRAKE.

1,394,990.  Specification of Letters Patent.  Patented Oct. 25, 1921.

Application filed September 2, 1919. Serial No. 321,067.

*To all whom it may concern:*

Be it known that I, FRELING C. FOSTER, a citizen of the United States, residing at Chicago, in the county of Cook and State of Illinois, have invented a certain new and useful Improvement in Car-Brakes, of which the following is a specification.

My invention relates to vehicle brakes and particularly to brakes for vehicles adapted to run upon fixed tracks. One object is to provide a brake which will act directly upon the track, and provide a bearing surface for braking which will be much greater than the bearing surface of the wheels of the vehicle.

One difficulty in connection with the sudden stopping of railroad vehicles is caused by the limited bearing surface of the wheels upon the track; thus even when the wheels are locked the braking effect is comparatively small. In such cases if the train or car is proceeding at a high rate of speed when the brake is applied it will slide sometimes for several hundred feet.

In my invention I provide a brake which is connected to the axle of a car and is adapted to bear directly upon and grip the rail upon which the car is running. My invention is illustrated more or less diagrammatically in the accompanying drawings wherein:

Figure I is a side elevation of a car with my brake applied.

Fig. II is an enlarged detail longitudinal section.

Fig. III is a sectional plan view of my brake as installed, section being made along the line 3—9 of Fig. II.

Fig. IV is an elevational detail view partly in section on the line 4—4 of Fig. II.

Fig. V is a section on the line 5—5 of Fig. IV.

Like parts are indicated by like characters in all the figures.

A is a car, supported on the wheels B. B by the axles C. C. The brake is pivoted at the points D. D. on the axles C. C. and comprises the web members $D^1$ $D^1$ which are separated so as to provide the open spaces $D^2$, $D^2$. $D^3$, $D^3$ are brake arm members and carry the brake shoes $D^4$, $D^4$. $D^5$ is a rod pivoted on and connecting the brake shoes. It carries the two lugs $D^6$, $D^6$.

E, E are supporting members adapted to hold the brake out of operative position. They are pivoted on the car body at $E^1$, $E^1$ and are normally held together by the spring $E^2$. They are provided with the inwardly bent portions $E^3$, $E^3$ and carry on their lower ends the hooks $E^4$, $E^4$, adapted to engage the lugs $D^6$ $D^6$ on the rod $D^5$.

F is a lever fulcrumed at $F^1$ and provided with the angular extension $F^2$ and the further extension $F^3$ curved concentrically with the wheel B and adapted to penetrate into the opening $D^2$. When the brake is in operative position, as shown in dotted lines in Fig. II the portion $F^3$ is adapted to bear against the surface $F^4$ of the opening $D^2$. $F^5$, $F^5$ are lateral extensions of the lever F and are adapted to lie within the members E, E, when the brake is held out of operative position. $F^6$, $F^6$ are hooks attached to the projections $F^5$, $F^5$ and adapted to engage the portions E, E and to hold them together when in the position shown in Fig. IV.

G is an air pressure cylinder. $G^1$, $G^1$ are piston rods mounted for reciprocation in it. Connected to them are the links $G^2$. $G^2$ which in turn are connected to the links $G^3$, $G^3$, which are pivoted on the car body at $G^4$, $G^4$. $G^5$, $G^5$ are lugs connecting the links $G^2$, $G^2$, with the levers F, F. By means of this linkage the pressure from the cylinder G, is transmitted through the levers F to the brake shoes when the latter are in operative position, on the track, and thus serve to apply the needed braking force.

The brake of this invention is designed to be used only in an emergency when the train for some reason must be brought to a sudden stop. When this occurs some time is usually spent before the train can go on and it is a simple matter for the train crew to replace the brakes by hand.

The use and operation of my invention are as follows:—

When it is desired to use my brake the operator of the locomotive or car through any suitable controlling means, preferably a foot control will apply the air pressure. This will release the supporting means, for the brake allowing it to drop upon the track. A further application of the air pressure, acting through the lever will bear down upon the brake with a constantly increasing pressure, so that the brake shoes may be held against the tracks with sufficient force to clamp them. The area of the brake shoe in contact with the track will be many times that of the wheels, and in ordinary practice would probably be more than a hundred times greater. By exerting sufficient pressure upon this extended area, the brake will be clamped against the track and will serve to bring the train or car to an almost instantaneous stop.

When downward force is applied to the lever, the lateral extensions on it bear against the inwardly bent portions of the supporting members and force them apart. Thus the brake supporting lugs are freed and the brake shoes fall upon the rails. Further pressure upon the levers will be applied, through them, to the brake shoes, and will thus exert the necessary braking force.

I claim:

1. A railroad vehicle brake comprising a brake member pivoted on the axle of a vehicle and adapted when in operative position to bear upon the rail beneath said vehicle, and additional pneumatic means for increasing the pressure of said brake member upon said road surface.

2. In a railroad vehicle brake, a pair of integral brake shoes comprising a brake member pivoted upon one of the axles of the vehicle truck, means for holding said brake above the rail and means for allowing it to rest upon the rail, additional pneumatic means adapted through a lever pivoted on said vehicle to bear upon a portion of said brake member to press it against said rail, a circular opening in said brake member adapted when said brake member is raised from said rail to inclose the end of said lever and to allow movement of said brake member relative to said lever.

3. In a railroad vehicle, a pair of integral brake shoes comprising a brake member pivoted upon one of the axles of the vehicle truck, means for holding said brake above the rail and means for allowing it to rest upon the rail, additional pneumatic means adapted through a lever pivoted on said vehicle to bear upon a portion of said brake member to press it against said rail, a circular opening in said brake member adapted when said brake member is raised from said rail to inclose the end of said lever and to allow movement of said brake member relative to said lever, the lower end of said lever adapted to bear against one of the inner walls of said opening when the brake is in operative position.

In testimony whereof, I affix my signature in the presence of two witnesses this 22nd day of August, 1919.

FRELING C. FOSTER.

Witnesses:
EDNA B. PETERSON,
MILDRED H. MACKE.